US011715486B2

(12) United States Patent
Sainath et al.

(10) Patent No.: US 11,715,486 B2
(45) Date of Patent: *Aug. 1, 2023

(54) CONVOLUTIONAL, LONG SHORT-TERM MEMORY, FULLY CONNECTED DEEP NEURAL NETWORKS

(71) Applicant: Google LLC, Mountain View, CA (US)

(72) Inventors: Tara N. Sainath, Jersey City, NJ (US); Andrew W. Senior, London (GB); Oriol Vinyals, London (GB); Hasim Sak, New York, NY (US)

(73) Assignee: Google LLC, Mountain View, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/731,464

(22) Filed: Dec. 31, 2019

(65) Prior Publication Data

US 2020/0135227 A1    Apr. 30, 2020

Related U.S. Application Data

(63) Continuation of application No. 14/847,133, filed on Sep. 8, 2015, now Pat. No. 10,783,900.

(60) Provisional application No. 62/059,494, filed on Oct. 3, 2014.

(51) Int. Cl.
| | | |
|---|---|---|
| *G06N 3/044* | (2023.01) | |
| *G06N 3/045* | (2023.01) | |
| *G10L 25/30* | (2013.01) | |
| *G10L 15/16* | (2006.01) | |
| *G10L 15/02* | (2006.01) | |

(52) U.S. Cl.
CPC .............. *G10L 25/30* (2013.01); *G06N 3/044* (2023.01); *G06N 3/045* (2023.01); *G10L 15/16* (2013.01); *G10L 15/02* (2013.01)

(58) Field of Classification Search
CPC ......... G10L 25/30; G10L 15/16; G10L 15/02; G06N 3/0445; G06N 3/0454
See application file for complete search history.

(56) References Cited

U.S. PATENT DOCUMENTS

| | | | | |
|---|---|---|---|---|
| 9,190,053 | B2 * | 11/2015 | Penn | ........................ G10L 15/16 |
| 9,824,684 | B2 * | 11/2017 | Yu | ............................ G10L 15/08 |
| 2007/0086655 | A1 * | 4/2007 | Simard | ................ G06K 9/4628 |
| | | | | 382/190 |

OTHER PUBLICATIONS

Elagouni K, Garcia C, Mamalet F, Sébillot P. Text recognition in videos using a recurrent connectionist approach. InInternational Conference on Artificial Neural Networks Sep. 11, 2012 (pp. 172-179). Springer, Berlin, Heidelberg. (Year: 2012).*

(Continued)

*Primary Examiner* — Oluwatosin O Alabi
(74) *Attorney, Agent, or Firm* — Honigman LLP; Brett A. Krueger; Grant Griffith

(57) ABSTRACT

Methods, systems, and apparatus, including computer programs encoded on computer storage media, for identifying the language of a spoken utterance. One of the methods includes receiving input features of an utterance; and processing the input features using an acoustic model that comprises one or more convolutional neural network (CNN) layers, one or more long short-term memory network (LSTM) layers, and one or more fully connected neural network layers to generate a transcription for the utterance.

10 Claims, 5 Drawing Sheets

(56) References Cited

OTHER PUBLICATIONS

Sainath, T.N., Kingsbury, B., Mohamed, A.R., Saon, G. and Ramabhadran, B., May 2014. Improvements to filterbank and delta learning within a deep neural network framework. In 2014 IEEE International Conference on Acoustics, Speech and Signal Processing (ICASSP) (pp. 6839-6843). IEEE. (Year: 2014).*
Baccouche, M., Mamalet, F., Wolf, C., Garcia, C., & Baskurt, A. (Sep. 2010). Action classification in soccer videos with long short-term memory recurrent neural networks. In International Conference on Artificial Neural Networks (pp. 154-159). Springer, Berlin, Heidelberg. (Year: 2010).*
Deng L, Chen J. Sequence classification using the high-level features extracted from deep neural networks. In2014 IEEE International Conference on Acoustics, Speech and Signal Processing (ICASSP) May 4, 2014 (pp. 6844-6848). IEEE. (Year: 2014).*
Hutchinson B, Deng L, Yu D. Tensor deep stacking networks. IEEE Transactions on Pattern Analysis and Machine Intelligence. Dec. 20, 2012;35(8):1944-57. (Year: 2012).*

* cited by examiner

CONVOLUTIONAL, LONG SHORT-TERM MEMORY, FULLY CONNECTED DEEP NEURAL NETWORKS

CROSS REFERENCE TO RELATED APPLICATIONS

This is a continuation of U.S. application Ser. No. 14/847,133, filed on Sep. 8, 2015, which claims priority to U.S. Provisional Application No. 62/059,494, filed on Oct. 3, 2014. The disclosures of the prior applications are considered part of and are incorporated by reference in the disclosure of this application.

BACKGROUND

This specification generally relates to using neural networks for speech recognition. Neural network models may be used to perform a wide variety of speech recognition tasks.

Some neural networks are convolutional neural networks (CNNs) that include one or more CNN layers and, optionally, one or more fully connected layers. Some other neural networks are Long Short-Term Memory (LSTM) neural networks that include one or more LSTM layers.

SUMMARY

According to one innovative aspect of the subject matter described in this specification, CNNs, LSTM, and DNNs are complementary in their modeling capabilities and may be combined into one acoustic model. CNNs are good at reducing frequency variations, LSTMs are good at temporal modeling, and DNNs are appropriate for mapping features to a more separable space.

In general, one innovative aspect of the subject matter described in this specification can be embodied in methods that include the actions of receiving input features of an utterance; and processing the input features using an acoustic model that comprises one or more convolutional neural network (CNN) layers, one or more long short-term memory network (LSTM) layers, and one or more fully connected neural network layers to generate a transcription for the utterance.

These and other implementations can each optionally include one or more of the following features. For example, the input features may include respective segment features for each of a plurality of segments of the utterance. To process the input features using the acoustic model to generate the transcription for the utterance, for each of the segments: the segment features for the segment may be processed using the one or more CNN layers to generate first features for the segment; the first features may be processed using the one or more LSTM layers to generate second features for the segment; and the second features may be processed using the one or more fully connected neural network layers to generate third features for the segment. The transcription for the utterance may be determined based on the third features for the plurality of segments. To process the first features using the one or more LSTM layers to generate the second features, the first features may be processed using a linear layer to generate reduced features having a reduced dimension from a dimension of the first features; and the reduced features may be processed using the one or more LSTM layers to generate the second features.

Short-term features having a first number of contextual frames may be generated based on the input features, where features generated using the one or more CNN layers may include long-term features having a second number of contextual frames that are more than the first number of contextual frames of the short-term features.

The one or more CNN layers, the one or more LSTM layers, and the one or more fully connected neural network layers may have been jointly trained to determine trained values of parameters of the one or more CNN layers, the one or more LSTM layers, and the one or more fully connected neural network layers. The input features may include log-mel features having multiple dimensions. The input features may include one or more contextual frames indicating a temporal context of an acoustic signal. To process the input features using the acoustic model to generate the transcription for the utterance, likelihoods of a particular acoustic state given the input features may be determined.

Advantageous implementations may include one or more of the following features. A unified architecture for an acoustic model leverages complimentary advantages associated with each of a CNN, LSTM, and DNN. For example, convolutional layers may reduce spectral variation in input, which may help the modeling of LSTM layers. Having DNN layers after LSTM layers helps to reduce variation in the hidden states of the LSTM layers. Training the unified architecture jointly provides a better overall performance. Training in a unified framework also removes the need to have separate CNN, LSTM and DNN architectures, which is very expensive. By adding multi-scale information into the unified architecture, information may be captured at different time scales.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, fully connected Deep Neural Networks (DNNs) have achieved tremendous success for large vocabulary continuous speech recognition (LVCSR) tasks compared to Gaussian Mixture Model/Hidden Markov Model (GMM/HMM) systems. Further improvements over DNNs may be obtained with alternative types of neural network architectures, including an architectures that combines Convolutional Neural Networks (CNNs) and Long-Short Term Memory (LSTMs). CNNs, LSTMs and DNNs in a unified framework. A Convolutional, Long Short-Term Memory, Deep Neural Networks (CLDNN) model is a model that includes a combination of CNN, LSTM, and DNN layers.

In general, LSTM layers are good for temporal modeling. In some implementations, higher-level modeling of the input to the LSTM layers may help to disentangle underlying factors of variation within the input, which may make it easier to learn temporal structure. CNN layers are good for reducing frequency variations, as CNNs layers may learn speaker-adapted or discriminatively trained features, and may help remove variation in the input to the LSTM layers. Thus, it may be beneficial to combine LSTM layers with one or more fully connected CNN layers in an acoustic model. Moreover, DNNs are good for mapping features to a more separable space, making the output of the model easier to predict.

In some implementations, input features, surrounded by temporal context, may be fed into one or more convolutional layers to reduce spectral variation in a model. The output of the CNN layers may be fed into one or more LSTM layers to reduce temporal variations in the model. The output of the last LSTM layer may then be fed to one or more fully connected DNN layers, which transform the features into a space that makes that output easier to classify.

Figure 1:
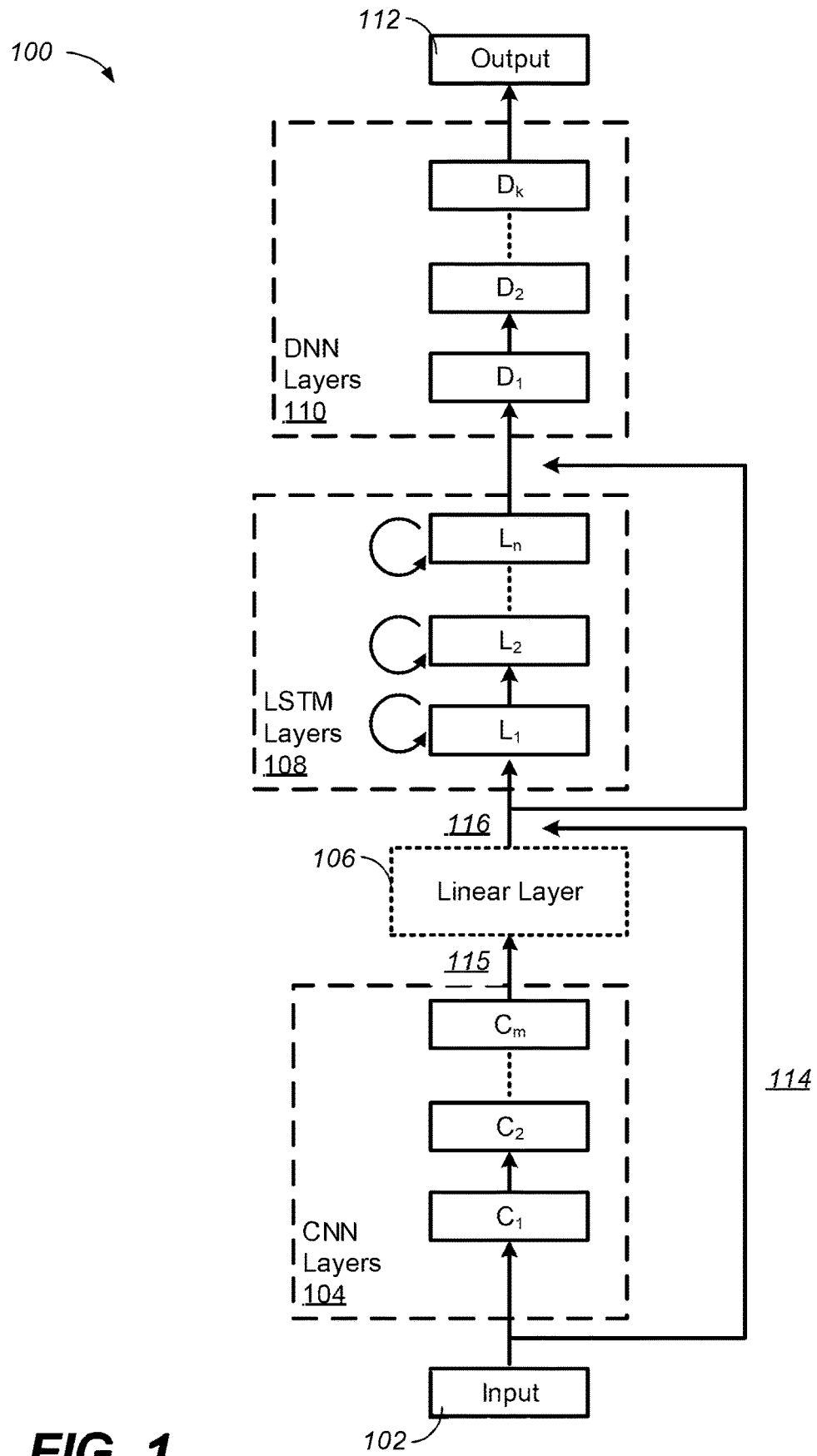
FIG. 1 is a block diagram of an example acoustic model based on CNN, LSTM, and DNN layers.

FIG. 1 shows a block diagram of an example system 100 that represents an acoustic model having CNN, LSTM, and DNN layers. The system 100 processes each input in a sequence of inputs to generate an output for each input. Each input in the sequence may represent features of a segment of a spoken utterance, and the output generated by the system 100 may be a transcription of the spoken utterance. In general, CNNs, LSTM, and DNNs are complementary in their modeling capabilities and may be combined into one acoustic model that provides a better overall performance (e.g., lower word-error-rate). The system 100 includes CNN layers 104, LSTM layers 108, and DNN layers 110. In general, the CNN layers 104 are configured to reduce spectral variations of the input 102. The LSTM layers 108 are configured for temporal modeling. The DNN layers 110 are configured to separate output features from the LSTM layers 108 into a more separable space. In some implementations, the system 100 may optionally include a linear layer 106 configured to reduce the dimensions of the output from the CNN layer 104.

The CNN layers 104 are configured to process the input 102 to generate a convolutional output 115. In general, the CNN layers 104 are configured to receive features which are locally correlated in time and frequency. The system 100 may receive a spoken utterance, and generate a sequence of frames that correspond to the spoken utterance. In some implementations, each frame may represent features of a segment of the spoken utterance. A segment of the spoken utterance may be, for example, a portion of the spoken utterance within a specified time window. In some implementations, adjacent frames may be used to provide contextual information related to the frame. For example, a frame $x_t$, surrounded by l contextual vectors to the left and r contextual vectors to the right, may be passed as input 102 to the system 100. This input 102 may be denoted as $[x_{t-l}, \ldots, x_{t+r}]$. For example, each frame $x_t$ may include a 40-dimensional log-mel feature. Alternatively, a log-mel feature having different dimensions may be included in a frame $x_t$. In some implementations, these features may be mean-and-variance normalized per speaker. For example, vocal tract length normalization (VTLN) may be used to warp the speech from different speakers and different vocal tract lengths into a canonical speaker with an average vocal tract length. In some implementations, speaker-adapted features that do not exhibit locality in frequency may be incorporated into the input 102. For example, feature-space maximum likelihood linear regression features (fMLLR) or speaker identity vectors (i-vectors) may be used.

Figure 2:
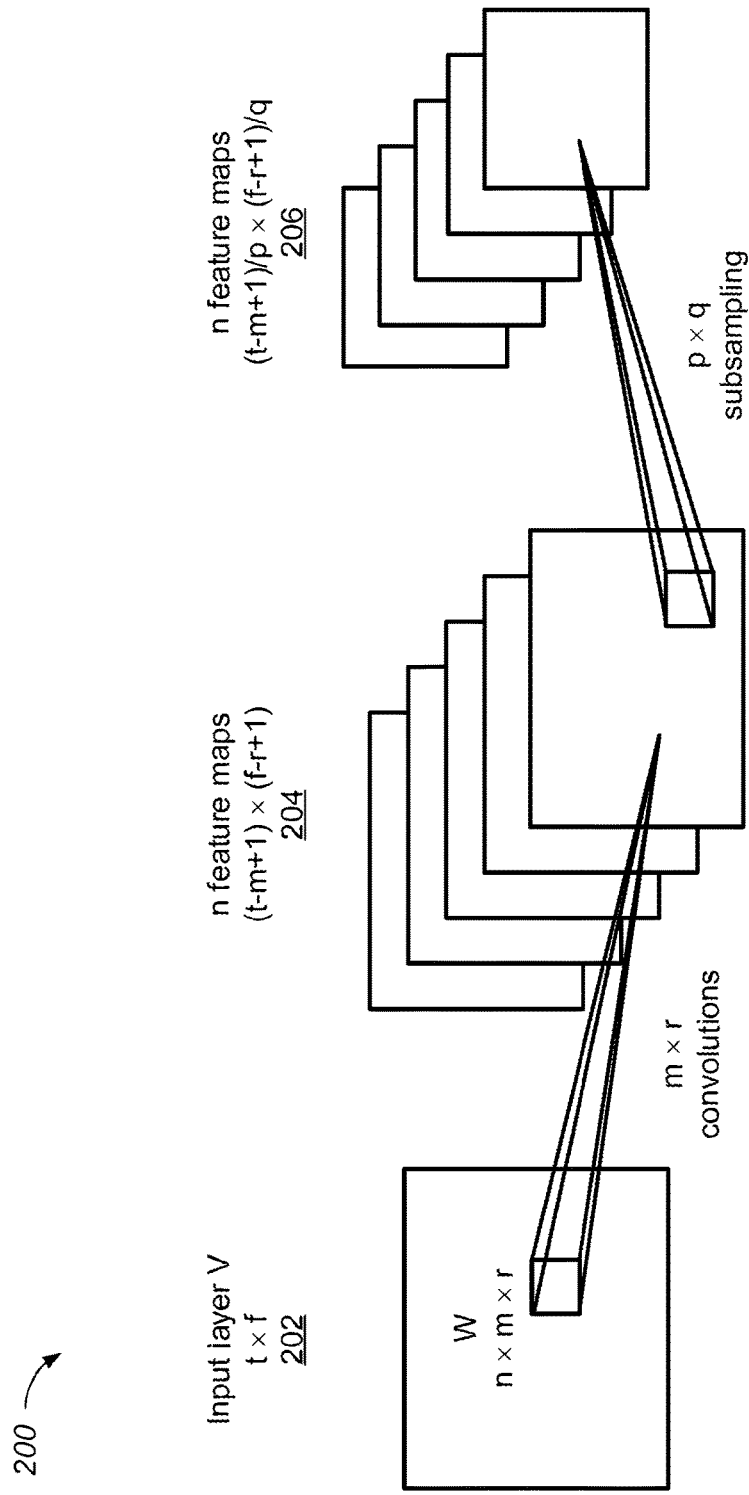
FIG. 2 is a block diagram of an example CNN architecture.

Referring to FIG. 2, an example CNN architecture 200 that may correspond to the CNN layers 104 is shown. Given an input signal 202, $V \in \Re^{t \times f}$, where t and f are the input feature dimension in time and frequency respectively, a weight matrix $W \in \Re^{m \times r \times n}$ is convolved with the full input V. The weight matrix spans across a small local time-frequency patch of size (m×r), where m<=t and r<=f. This weight sharing helps to model local correlations in the input signal V. In some implementations, the weight matrix W has n hidden units (i.e., feature maps). The convolutional operation produces n feature maps 204, each feature map having time-frequency space of size (t−m+1)×(f−r+1).

In some implementations, the CNN layers 104 include one or more max-pooling layers. After performing the convolution, a max-pooling layer may help to reduce the variability in the time-frequency space that exist due to factors such as speaking styles and channel distortions. For example, given a pooling size of p×q, pooling performs a subsampling operation to produce n feature maps 206, each feature map having reduced time-frequency space of size (t−m+1)/p×(f−r+1)/q.

Referring back to FIG. 1, in some implementations, the frequency variance in the input 102 may be reduced by passing the input 102 through one or more CNN layers $C_1$ to $C_m$, where m is an integer equal to or larger than one. For example, the input 102 may be passed through two CNN layers $C_1$ and $C_2$, each with 256 feature maps. A 9×9 frequency-time filter may be used for the first CNN layer $C_1$, followed by a 4×3 filter for the second CNN layer $C_2$, and these filters may be shared across the entire time-frequency space. Alternatively, the input 102 may be passed through a different number of CNN layers, each with a different number of feature maps, and a different type of filter may be used for a CNN layer.

In some implementations, non-overlapping max pooling may be used, and pooling in frequency only may be performed. For example, a pooling size of 3 may be used for the first CNN layer $C_1$, and no pooling may be done in the second CNN layer $C_2$. Alternatively, a different pooling size or no pooling may be used in any layer of the CNN layers 104.

In some implementations, the system 100 may include a linear layer 106 that receives an input of a first dimension and yields an output of a second, smaller dimension. For example, a linear layer 106 may receive an input represented by a matrix A having a dimension of m×n, and may yield an output represented by two matrices B and C having dimensions m×r and r×n, respectively, where A=B×C, and r is the rank of the matrix A. In some implementations, the linear layer 106 may be a neural network layer.

In general, the dimension of the last layer (i.e., $C_m$) of the CNN layers 104 may be large, due to the feature maps× time×frequency context. In some implementations, the linear layer 106 may be added after the last layer of the CNN layers 104 to reduce feature dimension, before passing the output to the LSTM layer 108. For example, the number of inputs 115 to the linear layer 106 may be 8×1×256 (feature-maps×time×frequency), and the number of outputs 116 from the linear layer 106 may be 256 after reducing the dimensionality. Alternatively, a different number of outputs 116 may be obtained from the linear layer 106 after reducing the dimensionality.

In some implementations, after frequency modeling is performed, the output of the CNN layers 104 may be passed to LSTM layers 108, which are appropriate for modeling the signal in time, and reducing variance in the signal due to different speaking rates. The LSTM layers 108 are configured to process the convolutional output 115 or the output 116 from the linear layer 106 to generate an LSTM output 118. In general, at each time step, each LSTM layer receives an input from the preceding LSTM layer. If a LSTM layer is the lowest layer in the sequence of LSTM layers (i.e., $L_1$), the lowest layer receives the output of the CNN layers 104, which represents the acoustic feature representation for the time step. For example, each LSTM layer $L_1$ to $L_n$ may have 832 cells and a 512 unit projection layer to reduce dimensions, where n is any integer. Alternatively, a LSTM layer may have a different number of cells or a different number of unit projection layer.

In some implementations, each LSTM layer of the LSTM layers 108 includes one or more LSTM memory blocks and a recurrent projection layer. The LSTM memory blocks process the input received by the LSTM layer, e.g., the acoustic representation for the current time step or the layer output generated by the preceding LSTM layer, to collectively generate an LSTM output for the time step. The recurrent projection layer receives the LSTM output generated by the LSTM memory blocks and generates a recurrent projected output from the LSTM output in accordance with current values of a set of parameters for the recurrent projection layer.

Figure 3:
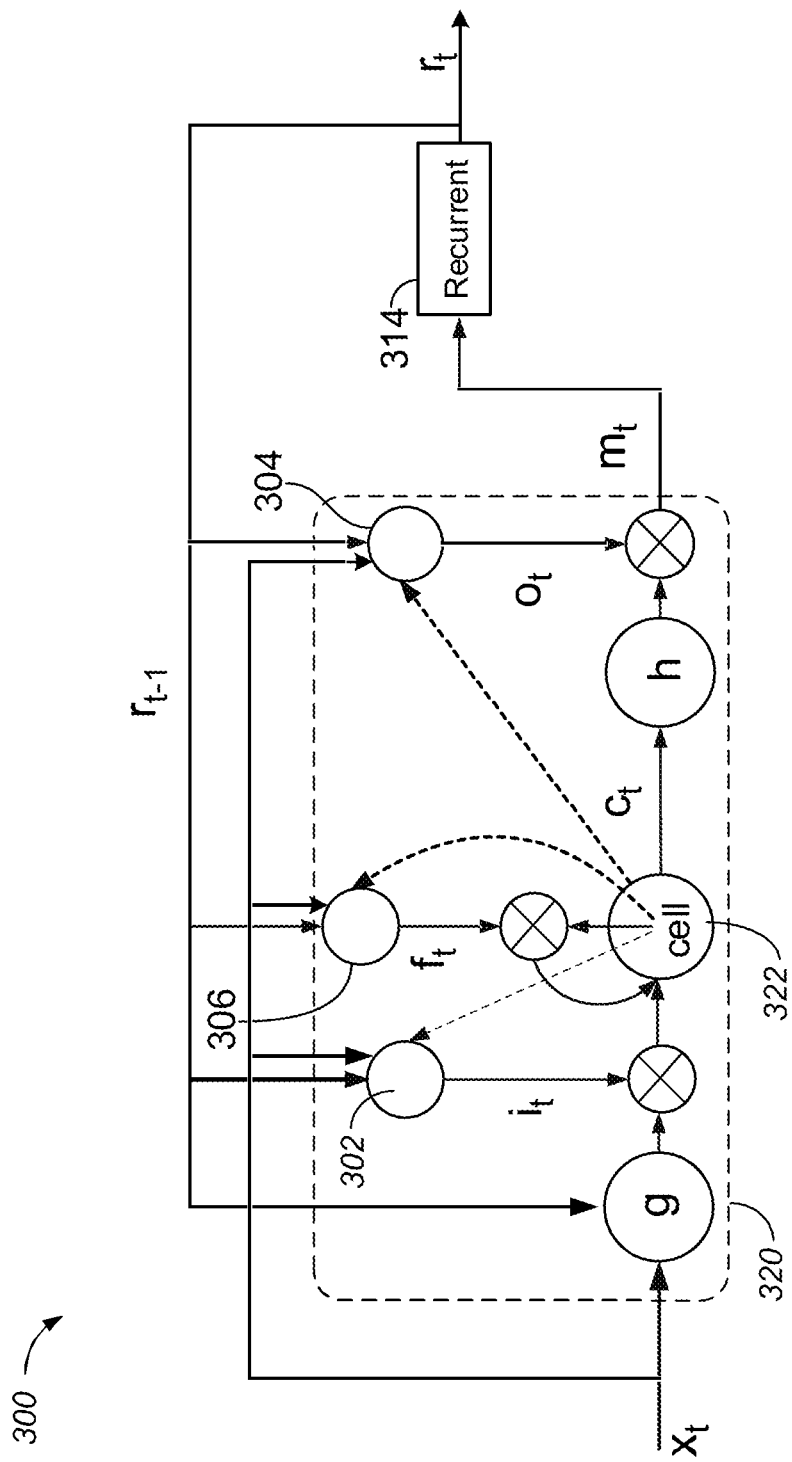
FIG. 3 is a block diagram of an example LSTM architecture.

FIG. 3 shows an example LSTM layer 300 that may correspond to any layer of the LSTM layers 108. The LSTM layer 300 includes one or more LSTM memory blocks, including a LSTM memory block 320. The LSTM memory block 320 includes an LSTM memory cell 322 that receives an input $x_t$ and generates an output $m_t$ from the input and from a previous recurrent projected output $r_{t-1}$. The input $x_t$ is the layer output for the current time step in an acoustic sequence or, if the LSTM layer 300 is in the lowest LSTM layer, the input $x_t$ is an acoustic feature representation at the current time step in an acoustic sequence. The previous recurrent projected output $r_{t-1}$ is the projected output generated by the recurrent projection layer from an output $r_{t-1}$ generated by the cell at the preceding time step in the acoustic sequence. That is, rather than a previous output $m_{t-1}$ of the LSTM memory cell at the preceding time step being fed back for use in calculating the output $m_t$ for the current time step, the previous recurrent projected output $r_{t-1}$ is fed back to the cell.

The LSTM memory block 320 includes an input gate 302 which controls the flow of input activations into the memory cell 322, and an output gate 304 which controls the output flow of the memory cell 322, and a forget gate 306 which scales the internal state of the memory cell 322 before adding it as input to the cell through the cell states.

In some implementations, the memory cell 322 computes the output $m_t$ so that $m_t$ satisfies the following equations:

$i_t = \sigma(W_{ix}x_t + W_{ir}r_{t-1} + W_{ic}c_{t-1} + b_i)$ $f_t = \sigma(W_{fx}x_t + W_{rf}r_{t-1} + W_{cf}c_{t-1} + b_f)$ $c_t = f_t \odot c_{t-1} + i_t \odot g(W_{cx}x_t + W_{cr}r_{t-1} + b_c)$ $o_t = \sigma(W_{ox}x_t + W_{or}r_{t-1} + W_{oc}c_t + b_o)$ $m_t = o_t \odot h(c_t)$ where $i_t$ is the input gate activation at the current time step, $f_t$ is the forget gate activation at the current time step, $o_t$ is the output gate activation at the current time step, $c_t$ is the cell activation at the current time step, $c_{t-1}$ is the cell activation at the previous time step, $\odot$ is an element-wise product operation, g is the cell input activation function, h is the cell output activation function, each W term is a respective matrix of current weight values for the LSTM memory block 320, and $b_i$, $b_f$, $b_c$, and $b_o$ are bias vectors.

Once the output $m_t$ has been computed, the recurrent projection layer 314 computes a recurrent projected output $r_t$ for the current time step using the output $m_t$. The recurrent projection layer 314 receives the LSTM output $m_t$ generated by the LSTM memory block 320 and generates a recurrent projected output $r_t$ from the LSTM output in accordance with current values of a set of parameters for the recurrent projection layer 314. In some implementations, the recurrent projection layer 314 projects the LSTM output into a lower-dimensional space in accordance with the current values of the parameters of the recurrent projection layer 314. That is, the recurrent projected output $r_t$ has a lower dimensionality than the LSTM output $m_t$ received by the recurrent projection layer 314. For example, in some implementations, the LSTM output $m_t$ received by the recurrent projection layer 314 may have a dimensionality that is approximately twice the dimensionality of the recurrent projected output $r_t$, e.g. one thousand versus five hundred or two thousand versus one thousand. In some implementations, the recurrent projected output $r_t$ satisfies:

$r_t = W_{rm}m_t$, where $W_{rm}$ is a matrix of current values of weights for the recurrent projection layer 314. The recurrent projected output $r_t$ can then be fed back to the memory block 320 for use in computing the output $m_{t+1}$ at the next time step in the acoustic sequence.

Referring back to FIG. 1, after performing frequency and temporal modeling, the output of the LSTM layers 108 may be passed to DNN layers 110 having one or more fully connected layers $D_1$ to $D_k$, where k is an integer equal to or larger than one. The DNN layers 110 are configured to process the output 118 from the LSTM layers 108 to generate output 120 for the output layer 112. In general, the DNN layers 110 are appropriate for producing a higher-order feature representation that is more easily separable into the different classes for discrimination. In some implementations, each fully connected DNN layer 110 may have a specific number of hidden units. For example, each fully connected DNN layers 110 may have 1024 hidden units. In some implementations, the DNN layers 110 may be trained as a maxout neural network. In maxout networks hidden units, e.g., nodes or neurons, at each layer are divided into non-overlapping groups. Each group may generate a single activation via the max pooling operation. For example, a hidden layer may include four hidden nodes, with a pool size of three. Each of the nodes produces an output, but only the maximum of the three outputs is selected by node to be the input to the next hidden layer.

The output of the DNN layers 110 is provided to an output layer 112. The output layer 112 is configured to determine a transcription for the utterance based on the output 120 from the DNN layers 110. For example, the output layer 112 can generate posterior probabilities P(state|X), each representing a likelihood of a respective acoustic state given the current set of input data, X.

In general, there may be complementarity between modeling the output of the CNN temporally with an LSTM, as well as discriminatively with a DNN. In some implementations, the output of the CNN layers 104 may be passed into both the LSTM layers 108 and DNN layers 110. For example, the output 116 of the linear layer 106 may be passed into both the LSTM layers 108 and DNN layers 110. In some implementations, extra DNN layers may be added. In some other implementations, the output of the CNN layers 104 may be passed directly into the DNN layers 110, without extra layers and thus with minimal increase in parameters.

In some implementations, the CNN layers 104, the LSTM layers 108, and the DNN layers 110 may be combined into one unified framework that is trained jointly. The LSTM performance may be improved by providing better features to the LSTM (which the CNN layers provide through reducing spectral variance), as well as improving output prediction by making the mapping between hidden units and outputs deeper (which the DNN layers provide).

The CNN, DNN and LSTM architectures may be trained on a training set. For example, a training set may include 300,000 English-spoken utterances (about 200 hours). As another example, a training set may include 3 million utterances (about 2,000 hours). In some implementations, noise may be added to a training set. For example, a noisy training set may be created by artificially corrupting clean utterances using a room simulator, adding varying degrees of noise and reverberation, such that the overall signal-to-noise ratio (SNR) is between 5 dB to 30 dB. In some implementations, training sets may be anonymized and hand-transcribed. As an example, the input 102 may include 40-dimensional log-mel filterbank features, computed every 10 msec. Alternatively, the input 102 may include features with a different dimension, or may be computed with a different period.

In some implementations, the DNN layers 110 may be trained using the cross-entropy criterion, using the asynchronous stochastic gradient descent (ASGD) optimization strategy. In some implementations, the weights for all CNN and DNN layers may be initialized using the Glorot-Bengio strategy. In some implementations, one or more LSTM layers 108 may be initialized to zero. In some implementations, the weights in each network may be randomly initialized prior to training. In some implementations, the learning rate may be chosen specific to each network, and may be chosen to be the largest value such that training remains stable.

In some implementations, the LSTM layers 108 may be unrolled for a predetermined time steps for training with truncated backpropagation through time (BPTT). For example, the LSTM layers 108 may be unrolled for 20 time steps for training with BPTT. In some implementations, the output state label may delayed by one or more frames, better predict the current frame. In some implementations, the input feature into the CNN layers 104 may include/contextual frames to the left and r to the right, which is then passed to the LSTM 108. In some implementations, in order to ensure that the LSTM does not see more than a specific number of frames of future context, r may be set to 0 to increase recognition latency.

In some implementations, the CNN layers 104 may take a long-term feature, seeing a context of t−l (i.e., r=0 in the CLDNN), and produces a higher order representation of the long-term feature to pass into the LSTM layers 108. The LSTM layers 108 may then unrolled for a number of time-steps, and thus may consume a larger context. For example, the LSTM layers 108 may unrolled for 20 time-steps, consuming a larger context of 20+l. In some implementations, there may be complementary information in passing the short-term feature to the LSTM layers 108. For example a sequence of 20 consecutive short-term features may be passed to the LSTM layers 108 with no context. In some implementations, to model short and long-term features, the original input 102 may be passed as input 114, along with the long-term feature from the CNN layers 104, into the LSTM layers 108. The short and long-term features may be used jointly in one network, to utilize the power of the sequential modeling of the LSTM layers 108.

In some implementations, each CNN, LSTM and DNN layers may capture information about the input representation at different time scales, and information and multiple time scales may be combined. For example, a long-term feature may be passed into the CNN layers 104, which then may be passed into the LSTM layers 108 along with a short-term feature. In some implementations, the output of the CNN layer layers 104 may be passed into both LSTM layers 108 and DNN layers 110.

Figure 4:
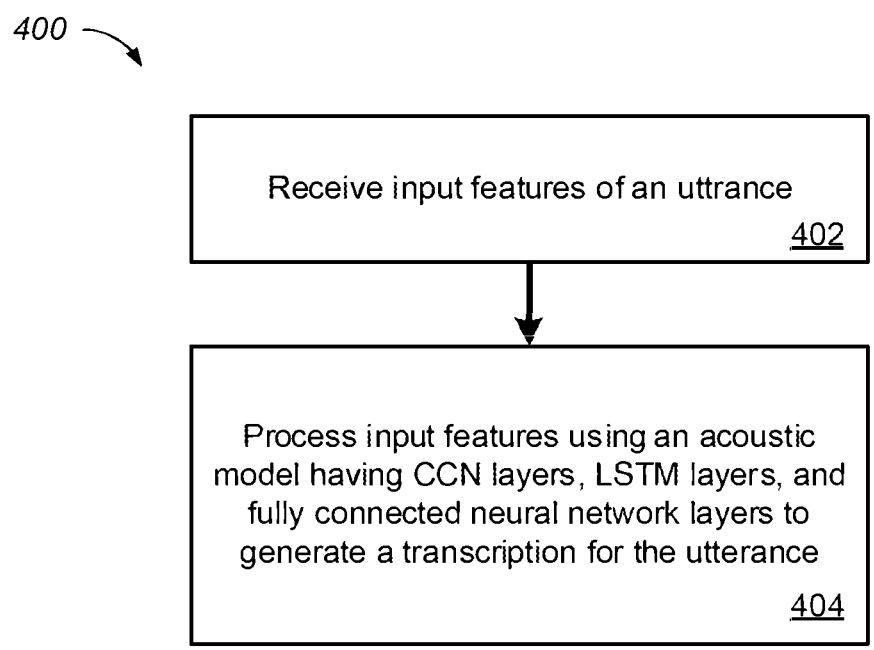
FIG. 4 is a flow diagram that illustrates an example of a process for processing an input using an acoustic model that includes CNN, LSTM, and DNN layers.

FIG. 4 is a flow diagram that illustrates an example of a process 400 for processing an input using an acoustic model that includes CNN, LSTM, and DNN layers. The process 400 may be performed by one or more systems, such as the system 100.

The system receives input features of an utterance (402). In some implementations, the input features may include log-mel features having multiple dimensions. For example, the input features may include a frame $x_t$, having a 40-dimensional log-mel feature. In some implementations, the input features include one or more contextual frames indicating a temporal context of an acoustic signal. For example, the input features may include a frame $x_t$, surrounded by l contextual vectors to the left and r contextual vectors to the right.

The system processes the input features using an acoustic model that includes one or more CNN layers, one or more LSTM layers, and one or more fully connected neural network layers to generate a transcription for the utterance (404). In some implementations, the system may process the input features using the one or more CNN layers to generate first features. For example, referring to FIG. 1, the CNN layers 104 may process the input 102 to generate a convolutional output 115. In some implementations, the system may generate, based on the input features, short-term features having a first number of contextual frames, where the output of the last layer of the convolutional neural network layers includes long-term features having a second number of contextual frames that are more than the first number of contextual frames of the short-term features, and where an input to the first layer of long short-term memory network layers includes the short-term features and the long-term features. For example, the CNN layers 104 may take a long-term feature, seeing a context of t−l to t (i.e., r=0 in the CLDNN), and produces a higher order representation of the long-term feature to pass into the LSTM layers 108. The LSTM layers 108 may unrolled for 20 time-steps, consuming a larger context of 20+l. A sequence of 20 consecutive short-term features may be passed to the LSTM layers 108 with no context. The short and long-term features may be used jointly in one network, to utilize the power of the sequential modeling of the LSTM layers 108. In some implementations, the input features may include respective segment features for each of a plurality of segments of an utterance, and for each segment, the system may process the input features using the one or more CNN layers to generate the first features.

In some implementations, the system may use one or more LSTM layers to process the output of the convolutional neural network layers to generate second features. For example, referring to FIG. 1, after frequency modeling of the CNN layers 104 is performed, the output of the CNN layer $C_m$ may be passed to the LSTM layers 108, which are appropriate for modeling the signal in time, and reducing variance in the signal due to different speaking rates. The LSTM layers 108 processes the output of the CNN layers 104 to produce an LSTM output. In some implementations, the input features may include respective segment features for each of a plurality of segments of an utterance, and for each segment, the system may use one or more LSTM layers to process the output of the convolutional neural network layers to generate the second features for each segment of an utterance.

In some implementations, the output of the last layer of the convolutional neural network layers has a first dimension. For example, the number of outputs from the CNN layer $C_m$ may be 8×1×256 (feature-maps×time×frequency). To provide the output of the last layer of the convolutional neural network layers to the first layer of the long short-term memory network layers, the system may provide the output of the last layer of the convolutional neural network layers to a linear layer to reduce a dimension of the output of the last layer of the convolutional neural network layers from the first dimension to a second dimension, and provide the output of the linear layer to the first layer of the long short-term memory network layers. For example, referring to FIG. 1, a linear layer 106 may be added after the CNN layer $C_m$ to reduce the feature dimension from 8×1×256 to 256.

In some implementations, the system may provide the input features to the first layer of the long short-term memory network layers. For example, a sequence of 20 consecutive short-term features may be passed to the LSTM layers 108 with no context. The system may process the first features and the input features using the one or more LSTM layers to generate the second features. For example, the system 100 may use either the convolutional output 115 or the linear layer output 116 and the input features 102 to generate the LSTM features.

In some implementations, the system may process the second features using the one or more fully connected neural network layers to generate third features. For example, referring back to FIG. 1, after performing frequency and temporal modeling, the system 100 may process the output of the LSTM layer $L_n$ using the DNN layers 110. The DNN layers 110 are appropriate for producing a higher-order feature representation that is more easily separable into the different classes for discrimination. In some implementations, the system may provide the output of the last layer of the convolutional neural network layers to the first layer of the fully connected neural network layers. For example, the output of the CNN layer layers 104 may be passed into both LSTM layers 108 and DNN layers 110. In some implementations, the input features may include respective segment features for each of a plurality of segments of an utterance, and for each segment, the system may process the second features using the one or more fully connected neural network layers to generate the third features.

In some implementations, the system may determine the transcription for the utterance based on the third features. In some implementations, the system may determine likelihoods of a particular acoustic state given the input features. For example, the output of the DNN layers 110 may be provided to an output layer 112. Each output from the DNN layers 110 may include a posterior probability P(state|X), representing a likelihood of a particular acoustic state given the current set of input data, X. The resulting scaled posterior probabilities are then input to the output layer 112 to determine the output of the system 100. In some implementations, the input features may include respective segment features for each of a plurality of segments of an utterance, and the system may determine the transcription for the utterance based on the third features for the plurality of segments.

In some implementations, the one or more CNN layers, the one or more LSTM layers, and the one or more DNN layers have been jointly trained to generate an acoustic model. For example, the DNN layers 110 may be trained using the cross-entropy criterion, using the asynchronous stochastic gradient descent (ASGD) optimization strategy, and the weights for all CNN and DNN layers may be initialized using the Glorot-Bengio strategy. In some implementations, one or more LSTM layers 108 may be initialized to zero. In some implementations, the weights in each network may be randomly initialized prior to training. In some implementations, the learning rate may be chosen specific to each network, and may be chosen to be the largest value such that training remains stable.

Figure 5:
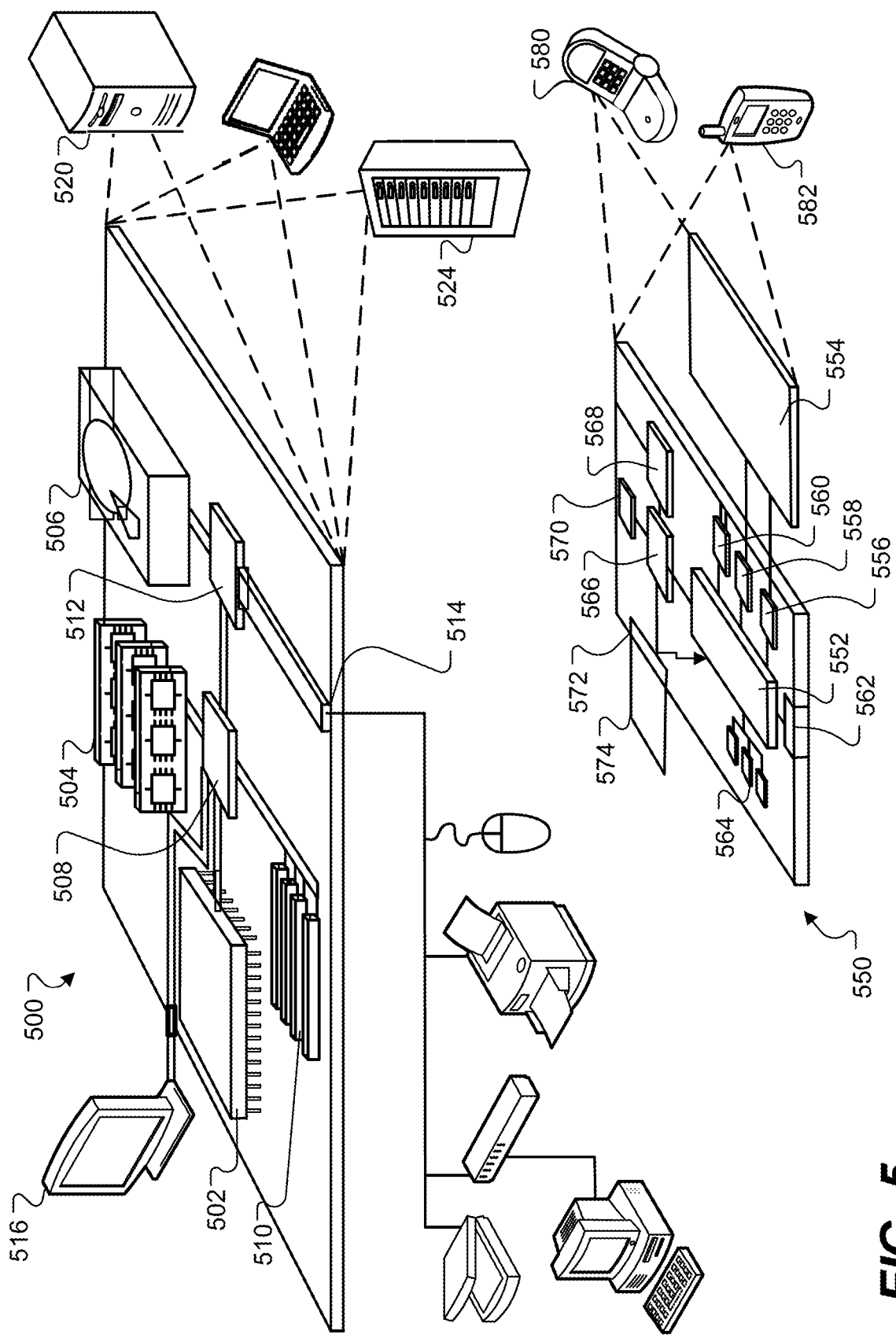
FIG. 5 is a schematic diagram that shows an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving input features, wherein the input features include respective segment features for each of a plurality of segments; and
   processing the input features using a model comprising one or more convolutional neural network (CNN) layers and one or more long short-term memory (LSTM) network layers, wherein the processing comprises:
   for each of the plurality of segments of the received input features:
      providing the respective segment features for the respective segment to:
         the one or more CNN layers, and
         the one or more LSTM network layers;
      generating first features for the respective segment by processing the respective segment features for the respective segment using the one or more convolutional neural network (CNN) layers, wherein the convolutional neural network (CNN) layers perform spatial modeling on the input feature;
      generating second features for the respective segment by processing both the respective segment features for the respective segment and the first features generated for the respective segment using the one or more long short-term memory network (LSTM) layers to perform temporal modeling over the first features and the respective segment features, wherein a first layer of the one or more LSTM layers is configured to receive, as input, both the respective segment features for the respective segment and the first features generated for the respective segment; and
   determining an output feature based on at least the second features for the plurality of segments.

2. The method of claim 1, wherein processing the first features using the one or more LSTM layers to generate the second features comprises:
   processing the first features using a linear layer to generate reduced features having a reduced dimension from a dimension of the first features; and
   processing the reduced features using the one or more LSTM layers to generate the second features.

3. The method of claim 1, wherein the one or more CNN layers, the one or more LSTM layers, and the one or more fully connected neural network layers have been jointly trained to determine trained values of parameters of the one or more CNN layers, the one or more LSTM layers, and the one or more fully connected neural network layers.

4. The method of claim 1, wherein the input features include log-mel features having multiple dimensions.

5. A system comprising one or more computers and one or more storage devices storing instructions that when executed by the one or more computers cause the one or more computers to perform operations comprising:
   receiving input features, wherein the input features include respective segment features for each of a plurality of segments; and
   processing the input features using a model comprising one or more convolutional neural network (CNN) layers and one or more long short-term memory (LSTM) network layers, wherein the processing comprises:
   for each of the plurality of segments of the received input features:
      providing the respective segment features for the respective segment to:
         the one or more CNN layers, and
         the one or more LSTM network layers;
      generating first features for the respective segment by processing the respective segment features for the respective segment using one or more convolutional neural network (CNN) layers, wherein the convolutional neural network (CNN) layers perform spatial modeling on the input feature;
      generating second features for the respective segment by processing both the respective segment features for the respective segment and the first features generated for the respective segment using one or more long short-term memory network (LSTM) layers to perform temporal modeling over the first features and the respective segment features, wherein a first layer of the one or more LSTM layers is configured to receive, as input, both the respective segment features for the respective segment and the first features generated for the respective segment; and determining an output feature based on at least the second features for the plurality of segments.

6. The system of claim 5, wherein processing the first features using the one or more LSTM layers to generate the second features comprises:

processing the first features using a linear layer to generate reduced features having a reduced dimension from a dimension of the first features; and processing the reduced features using the one or more LSTM layers to generate the second features.

7. The system of claim 5, wherein the one or more CNN layers, the one or more LSTM layers, and the one or more fully connected neural network layers have been jointly trained to determine trained values of parameters of the one or more CNN layers, the one or more LSTM layers, and the one or more fully connected neural network layers.

8. A computer program product encoded on one or more non-transitory computer storage media, the computer program product comprising instructions that when executed by one or more computers cause the one or more computers to perform operations comprising:

receiving input features, wherein the input features include respective segment features for each of a plurality of segments; and processing the input features using a model comprising one or more convolutional neural network (CNN) layers and one or more long short-term memory (LSTM) network layers, wherein the processing comprises:

for each of the plurality of segments of the received input features:

providing the respective segment features for the respective segment to:

the one or more CNN layers, and the one or more LSTM network layers;

generating first features for the respective segment by processing the respective segment features for the respective segment using one or more convolutional neural network (CNN) layers, wherein the convolutional neural network (CNN) layers perform spatial modeling on the input feature;

generating second features for the respective segment by processing both the respective segment features for the respective segment and the first features generated for the respective segment using one or more long short-term memory network (LSTM) layers to perform temporal modeling over the first features and the respective segment features, wherein a first layer of the one or more LSTM layers is configured to receive, as input, both the respective segment features for the respective segment and the first features generated for the respective segment; and determining an output feature based on at least the second features for the plurality of segments.

9. The computer program product of claim 8, wherein processing the first features using the one or more LSTM layers to generate the second features comprises:

processing the first features using a linear layer to generate reduced features having a reduced dimension from a dimension of the first features; and processing the reduced features using the one or more LSTM layers to generate the second features.

10. The computer program product of claim 8, wherein the one or more CNN layers, the one or more LSTM layers, and the one or more fully connected neural network layers have been jointly trained to determine trained values of parameters of the one or more CNN layers, the one or more LSTM layers, and the one or more fully connected neural network layers.

* * * * *